United States Patent [19]

Baxter

[11] Patent Number: 4,903,977
[45] Date of Patent: Feb. 27, 1990

[54] LANDING GEAR FOR A VEHICLE

[75] Inventor: Bobby G. Baxter, Warrenton, Mo.

[73] Assignee: The Binkley Company, Warrenton, Mo.

[21] Appl. No.: 237,291

[22] Filed: Aug. 26, 1988

Related U.S. Application Data

[63] Continuation of Ser. No. 48,597, May 11, 1987, Pat. No. 4,824,136.

[51] Int. Cl.$^4$ ............................................. B60S 9/00
[52] U.S. Cl. .................... 280/475; 254/419; 254/DIG. 1; 280/763.1
[58] Field of Search .................. 280/475, 763.1, 764.1, 280/765.1, 766.1; 212/189; 16/42 T; 248/188.8, 188.9, 352; 254/DIG. 1, 418, 419, 420

[56] References Cited

U.S. PATENT DOCUMENTS

| | | | |
|---|---|---|---|
| 3,219,362 | 11/1965 | Epstein | 280/763.1 |
| 3,666,290 | 5/1972 | Dalton et al. | 280/763.1 |
| 4,183,495 | 1/1980 | Adam et al. | 248/558 |
| 4,417,637 | 11/1983 | Hardy et al. | 180/116 |
| 4,461,491 | 7/1984 | Eklund | 280/763.1 |
| 4,462,612 | 7/1984 | Dreyer et al. | 280/766.1 |
| 4,634,144 | 1/1987 | Ringe | 280/763.1 |

Primary Examiner—Mitchell J. Hill
Attorney, Agent, or Firm—Senniger, Powers Leavitt and Roedel

[57] ABSTRACT

Landing gear for a vehicle such as a trailer, comprising a leg, a foot at the lower end of the leg adapted for engagement with the ground, a pair of generally channel-shaped members forming a tube which extends up from the foot and telescopically receives the lower end of the leg, an elastomeric member disposed in the tube between the lower end of the leg and the foot, and a bearing plate in the tube interposed between the elastomeric member and the lower end of the leg. The tube is attached to the lower end of the leg to permit limited telescopic movement of the leg and the foot whereby the foot is adapted to move upwardly relative to the leg as the landing gear accepts the weight of the vehicle thereby resiliently to compress the elastomeric member between the foot and the bearing plate. A method of making the foot and tube of the landing gear is also disclosed.

14 Claims, 4 Drawing Sheets

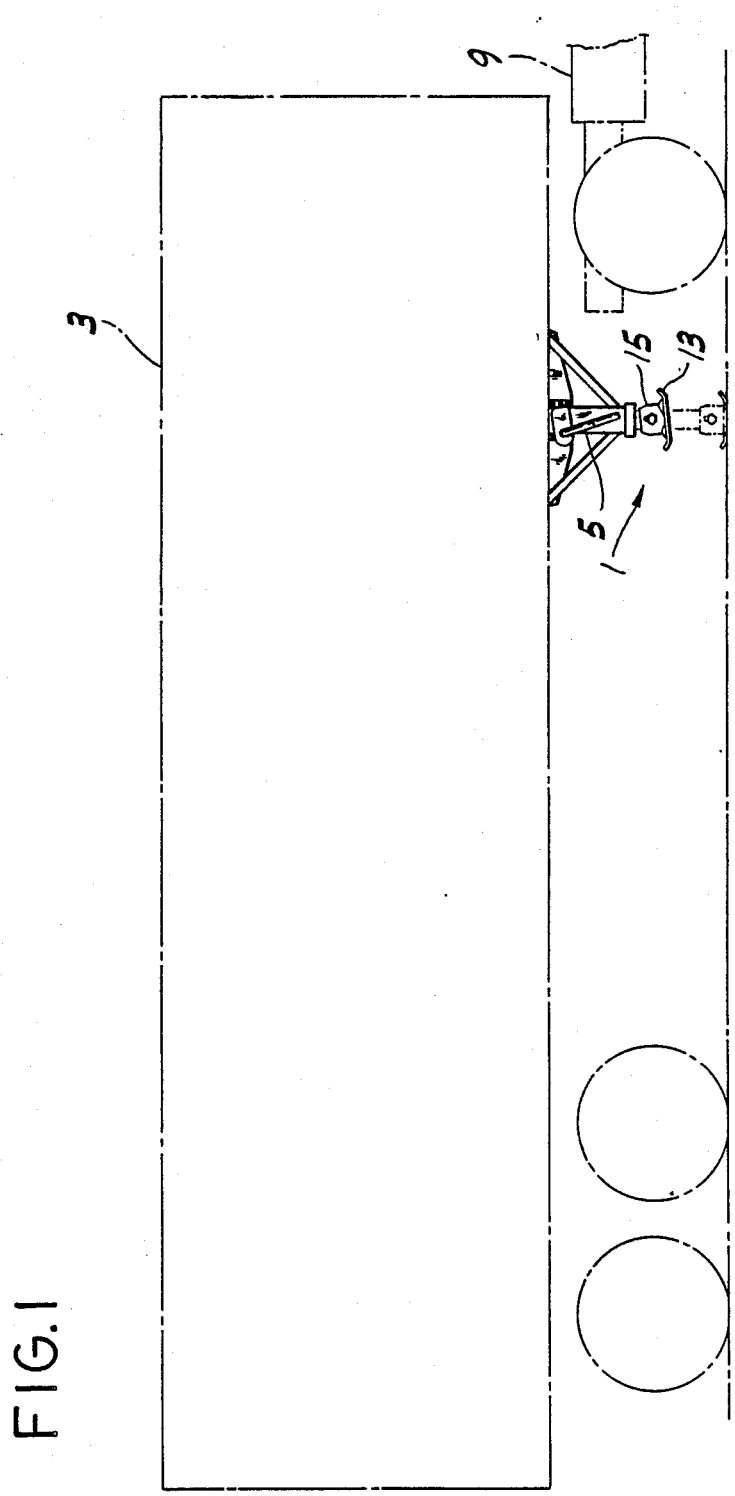

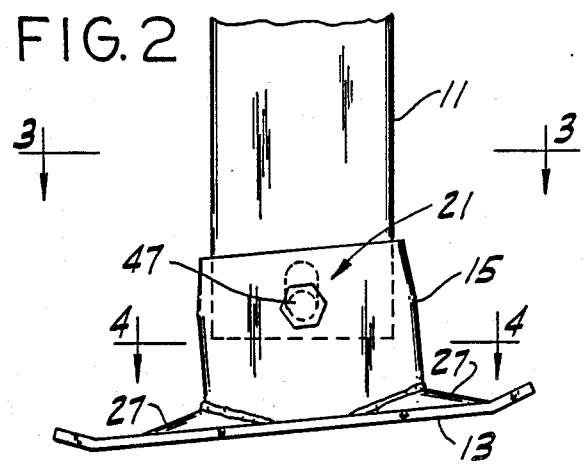
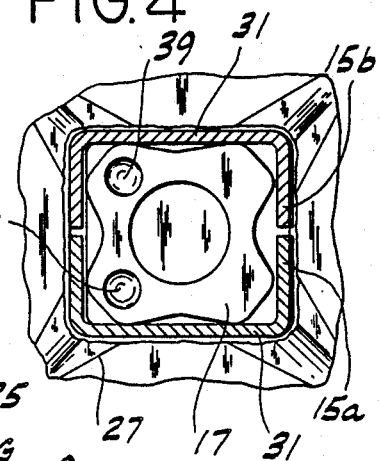
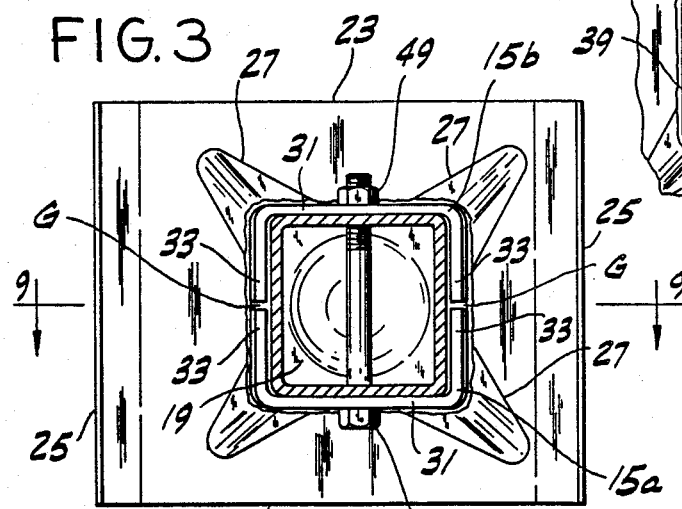
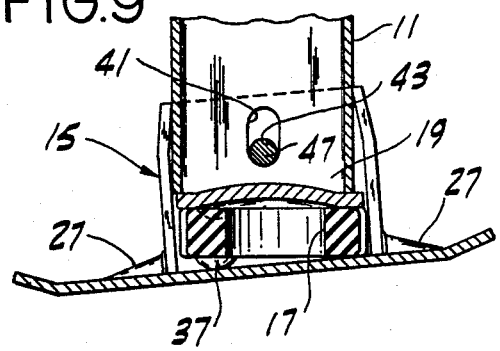
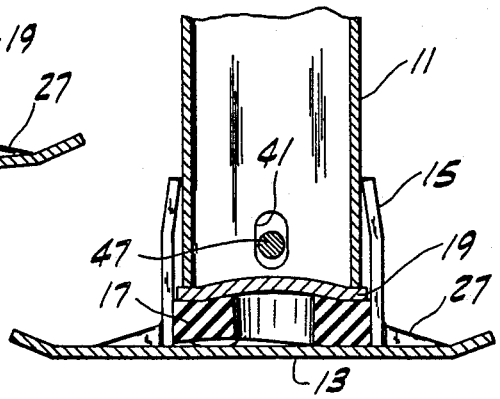

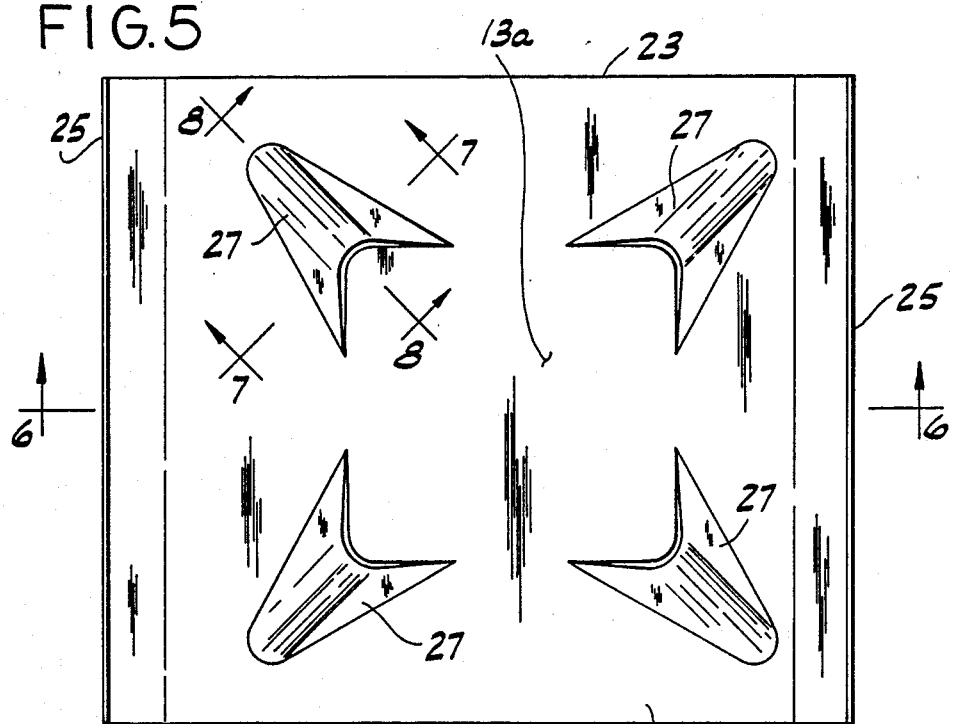
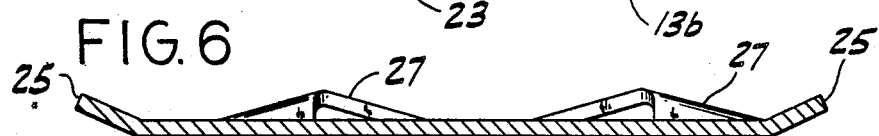
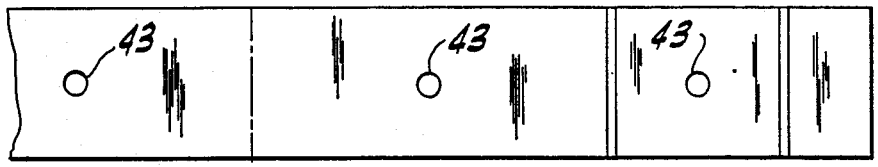
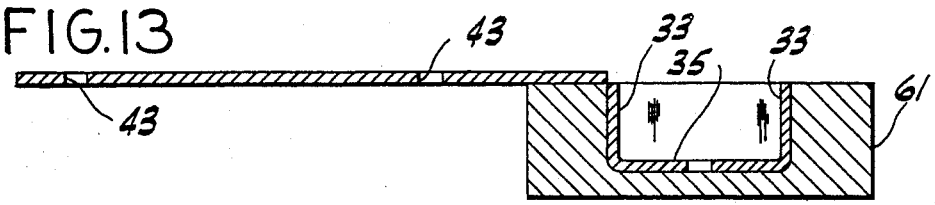

FIG.IIA
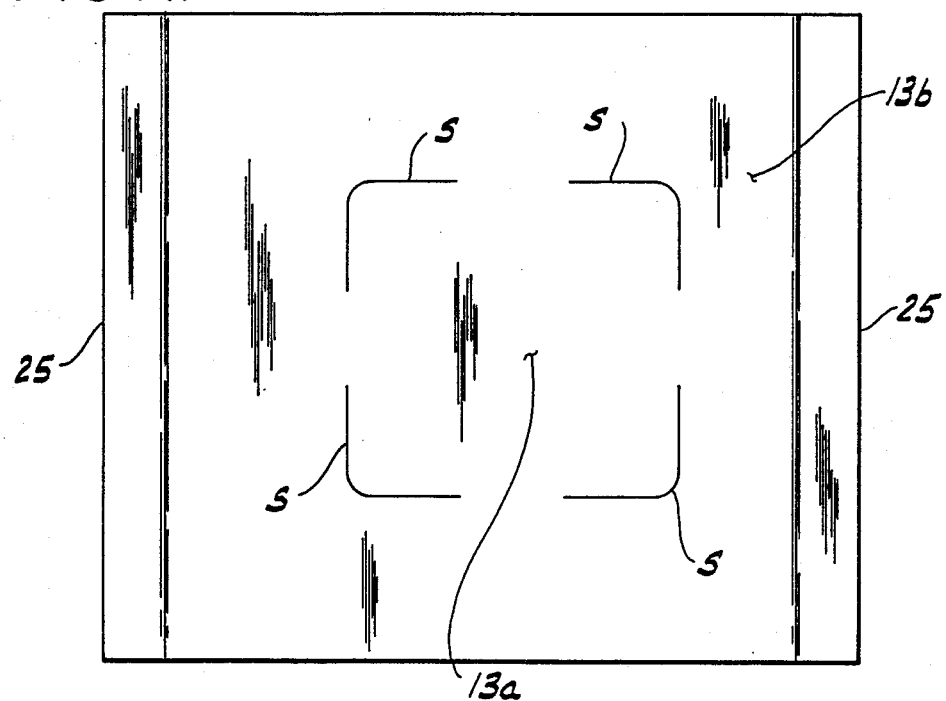
FIG.IIB
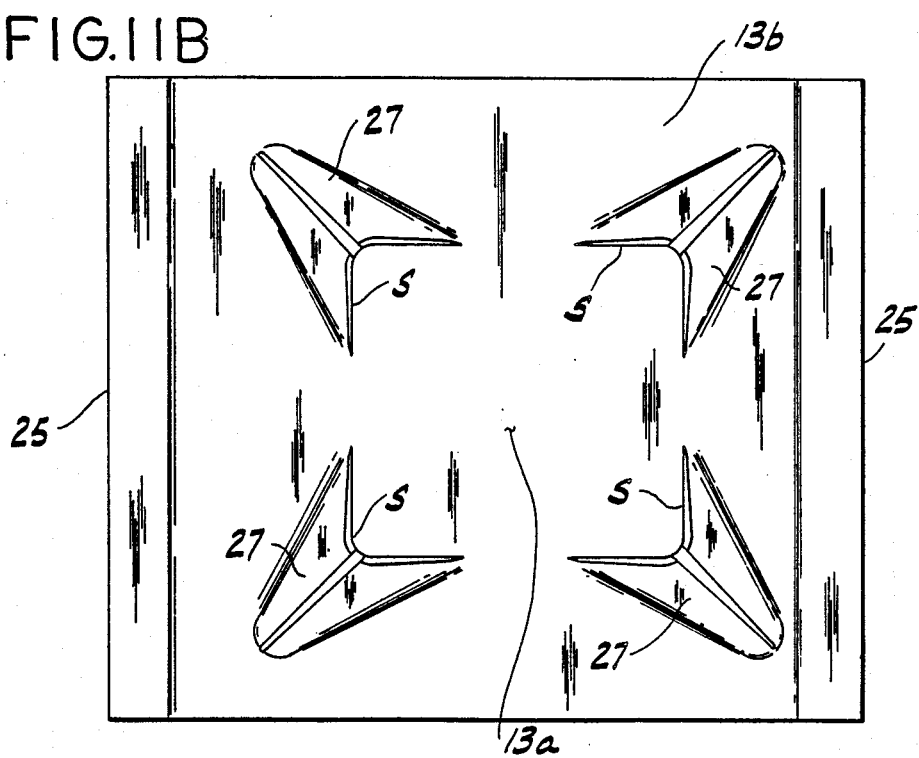

LANDING GEAR FOR A VEHICLE

This is a continuation of application Ser. No. 048,597, filed May 11, 1987 now U.S. Pat. No. 4,824,136 issued Apr. 25, 1989.

BACKGROUND OF THE INVENTION

This invention relates generally to landing gear for supporting a vehicle when the vehicle is parked and, more particularly, to a new foot design for such landing gear. While the landing gear of the present invention may have other applications, it is particularly suited for supporting one end of a trailer when the trailer is uncoupled from its tractor and parked.

Reference may be made to U.S. Pat. Nos. 3,666,290, 4,634,144, Re. 31,011 and 4,462,612 for landing gear in the field of this invention.

SUMMARY OF THE INVENTION

Among the several objects of this invention may be noted the provision of an improved foot design for landing gear of the type used to support trailers, for example, when parked; the provision of such landing gear which effectively absorbs shock; the provision of such landing gear which is durable and economical to construct; the provision of such landing gear wherein the foot is adapted to assume an inclined position during transport of the vehicle to avoid catching on objects as the vehicle travels forward; the provision of such landing gear which provides for drainage of liquid (e.g., rainwater) from the foot area; and the provision of an economical method of making such landing gear.

Generally, landing gear of the present invention comprises a leg, a foot at the lower end of the leg adapted for engagement with the ground, a pair of generally channel-shaped members forming a tube which extends up from the foot and telescopically receives the lower end of the leg, an elastomeric member disposed in the tube between the lower end of the leg and the foot, bearing plate means in the tube interposed between the elastomeric member and the lower end of the leg, and means attaching the tube to the lower end of the leg and permitting limited telescopic movement of the leg and the foot whereby the foot is adapted to move upwardly relative to the leg as the landing gear accepts the weight of the vehicle thereby resiliently to compress the elastomeric member between the foot and said bearing plate means.

In another aspect of the invention, the landing gear comprises a leg, a foot at the lower end of the leg adapted for engagement with the ground, said foot comprising a metal plate having a central portion and an outer portion surrounding said central portion, a plurality of upwardly-projecting ribs in the outer portion of the plate radiating outwardly from said central portion of the plate, and a metal tube extending up from the foot and receiving the lower end of said leg. The tube is welded at its lower end to the central portion of the plate and at its sides to the inner ends of the ribs. An elastomeric member is disposed in the tube between the lower end of the leg and the foot. Bearing plate means in the tube is interposed between the elastomeric member and the lower end of the leg. Means is provided attaching the tube to the lower end of the leg and permitting limited telescopic movement of the leg and the tube whereby the foot is adapted to move upwardly relative to the leg as the landing gear accepts the weight of the vehicle thereby resiliently to compress the elastomeric member between the foot and said bearing plate means.

A method of the present invention for making landing gear of the above-mentioned type involves forming the foot from a metal plate having a central portion and an outer portion surrounding said central portion by (a) cutting the plate to form a plurality of slits in the plate at the periphery of said central portion of the plate and (b) deforming the plate to provide a plurality of upwardly projecting ribs in said outer portion of the plate extending outwardly from said slits toward the periphery of the plate; and then securing the tube at its bottom to the central portion of the plate.

In a second aspect, the method involves bending metal sheet to form two generally channel-shaped members, forming a metal plate constituting the foot, applying the channel-shaped members to a central portion of the metal plate with said members extending generally at right angles to the plate and forming a tube, and welding the tube at one end thereof to the plate.

Other objects and features will be in part apparent and in part pointed out hereinafter.

BRIEF DESCRIPTION OF THE DRAWINGS

FIG. 1 is a side elevation of a vehicle (i.e., a trailer) having improved landing gear of the present invention;

FIG. 2 is an enlarged elevation of a portion of the landing gear showing a leg and a foot at the lower end of the leg;

FIG. 3 is a horizontal section taken on line 3—3 of FIG. 2;

FIG. 4 is a horizontal section taken on line 4—4 of FIG. 2;

FIG. 5 is a plan view of a foot of the landing gear;

FIGS. 6-8 are vertical sections taken on lines 6—6, 7—7 and 8—8, respectively, of FIG. 5;

FIG. 9 is a section on line 9—9 of FIG. 3 showing the landing gear retracted and the foot in an inclined position;

FIG. 10 is a view similar to FIG. 9 showing the landing gear extended and bearing the weight of the vehicle;

FIGS. 11A and 11B are views illustrating a method of making the foot of the landing gear; and FIGS. 12 and 13 are views illustrating a method of fabricating the tube of the landing gear.

Corresponding reference characters indicate corresponding parts throughout the several views of the drawings.

DESCRIPTION OF THE PREFERRED EMBODIMENT

Referring now to the drawings, and first more particularly to FIG. 1, there is generally indicated at 1 landing gear of the present invention for supporting a vehicle such as a trailer 3, shown in phantom. The landing gear is attached in conventional fashion to the underside of the trailer toward the front of the trailer and at one side thereof, an identical landing gear, not shown, being provided at the opposite side of the trailer. The landing gear is extensible and retractable by conventional means such as a crank-operated mechanism 9 between a retracted position (FIG. 1) in which it is clear of the ground for transport of the trailer by means of a tractor 9 (also shown in phantom), and an extended position in which it is adapted for engagement with the ground to support the trailer when the trailer is uncoupled from its tractor and parked.

As illustrated in FIGS. 2–5, the landing gear comprises a leg 11 formed from tubular bar stock of square cross section, a shoe or foot 13 at the lower end of the leg adapted for engagement with the ground when the landing gear is in its extended position, and a tube, generally designated 15, which extends up from the foot and telescopically receives the lower end of the leg, as illustrated in FIG. 2. An elastomeric member 17 is disposed in the tube 15 between the lower end of the leg 11 and the foot 13. Indicated at 19 and interposed between the elastomeric member and the bottom of the leg is bearing plate means in the form of a bearing plate which functions to transmit the weight of the trailer as carried by the leg to the elastomeric member 17 and foot 13 therebelow. Means generally designated 21 is provided for attaching the tube to the lower end of the leg 11 and permitting limited telescopic movement of the leg and the tube whereby the foot is adapted to move upwardly relative to the leg as the landing gear accepts the weight of the trailer thereby resiliently to compress the elastomeric member 17 between the foot 13 and bearing plate 19.

More specifically, the foot 13 comprises a generally rectangular metal plate of suitable thickness (e.g., ⅜ in.) having opposite sides 23 extending generally parallel to the sides of the trailer and opposite ends 25 extending generally parallel to the front and back of the trailer, the ends of the plate being bent upwardly in conventional fashion. As indicated, the foot has a central portion 13a, an outer portion 13b surrounding the central portion, and a plurality of ribs (four ribs are shown), each designated 27, formed by upwardly-struck sections of the outer the plate extending generally diagonally from the periphery of the central portion 13a of the foot toward the corners of the foot. These ribs are of generally inverted-V shape in transverse section (FIG. 7) and slope downwardly at approximately a 12–13 degree angle as they extend outwardly from the central portion of the foot (FIG. 8). The ribs 27 are relatively wide at their inner ends and relatively narrow at their outer ends, as illustrated in FIG. 5.

The inner edges of the ribs 27 (i.e., the edges adjacent the central portion 13a of the foot) are shaped and contoured to correspond to the shape of the tube 15 which, as illustrated, is generally rectangular in horizontal cross section. The inner edge of each rib 27 is in the form of a shoulder sufficiently wide to engage not only a respective corner of the tube 15 but also substantial portions of adjacent side walls of the tube. The tube 15, as illustrated, comprises a pair of substantially identical generally channel-shaped members 15a, 15b, each having a web 31 and a pair of flanges 33 extending generally at right angles to the web, the members being generally symmetric about a central vertical plane of the tube. The channel members 15a, 15b are disposed so that the vertical edges of the flanges of one channel-shaped member face the vertical edges of the flanges of the other channel-shaped member to form a generally rectangular tube, although it will be understood that other configurations may be used without departing from the scope of this invention. The flanges 33 of adjacent channel members 15a, 15b are spaced apart but relatively close to one another to provide relatively narrow gaps G extending axially of the tube 15 at opposite sides of the tube to facilitate drainage of liquid (e.g., rainwater) from the tube. The tube 15 should have a wall thickness (e.g., ¼ in.) sufficient to provide the necessary strength. The tube 15 (i.e., channel members 15a, 15b) is welded at its bottom to the foot 13 and at its sides to the inner ends of the ribs 27, the latter of which thus strengthen not only the plate but also the tube. The upper end of the tube is bent inwardly to provide a relatively close fit with the leg 11. The cross-sectional inside dimensions of the tube below its inwardly-swaged upper end are somewhat greater than the corresponding outside cross-sectional dimensions of the leg so as to enable limited pivotal movement of the foot relative to the leg, as will be described.

The elastomeric member 17 comprises a flat relatively thick (e.g., 1-5/16 in.) annular pad of suitable elastomeric material, such as natural rubber, having an outline or peripheral shape generally corresponding to the interior shape of the tube 15, which is illustrated to be generally rectangular. The pad has a pair of bosses or feet, each designated 37, projecting down from its bottom face adjacent the rearward side of the pad (i.e., toward the rear of the vehicle) and a corresponding number of depressions 39 in its upper face (FIG. 4) immediately opposite the bosses to accommodate compression of the bosses when the pad is compressed under the load of the trailer, as illustrated in FIG. 10. The bosses 37 on the pad give the pad a generally wedge-shaped configuration as viewed from the side, which causes the foot to pivot to an inclined position in which it slopes downwardly in front-to-rear direction when the landing gear is retracted (see FIG. 9). The pad 17 and bosses should be so dimensioned that the angle of slope or tilt is approximately five degrees off a plane generally at right angles to the leg 11. Regardless of whether the pad 17 has feet, the naturally inclined or tilted orientation of the foot may be ensured by constructing the foot so that its center of gravity is offset rearwardly with respect to the central vertical axis of the leg 11. This offset will cause the foot to pivot to the point where the tube wall engages the leg to limit further pivoting.

As shown in FIGS. 3 and 9, the bearing plate 19 is also of a shape conforming to the shape of the leg 11 and tube 15, which in this case is generally rectangular (or, more particularly, square). The dimensions of the plate should be somewhat greater than the cross-sectional dimensions of the leg so that the leg bears directly on the bearing plate. The plate 19 is dished or domed upwardly to accommodate upward deformation of the elastomeric pad 17 when it is compressed. However, the upper face of the bearing plate has flat peripheral edge margins engageable by the bottom edges of the leg to provide a flat engagement of the leg with the plate to prevent outward flaring of the lower end of the leg under the weight of the trailer.

Means 21 for attaching the tube 15 and the foot 13 thereon to the leg 11 is a pin-and-slot connection between the tube and the leg comprising a pair of diametrically opposing slots 41 in opposite side walls of the leg 11, a pair of corresponding circular holes 43 in the channel-shaped members 15a, 15b forming the tube 15, and a bolt 47 extending generally horizontally through the slots and holes at a location above the bearing plate 19. It will be understood that the bolt functions as a pivot for the foot to swing on the leg about a generally horizontal axis extending in side-to-side direction with respect to the trailer. A nut 49 threaded on the bolt 47 holds the assembly together.

The slots 41 in the leg permit limited up and down telescopic movement of the tube and leg sufficient to ensure that the entire load of the trailer is transferred to the elastomeric pad 17 and foot 13 when the landing gear is being used to support the trailer. This is best illustrated in FIGS. 9 and 10, the former of which shows the landing gear in retracted position with the foot inclined, the elastomeric pad 17 under little if any compression, and the bolt 47 at the bottom of the slots 41 in the leg thereby to prevent any further separation between the foot and the bottom of the leg. When the leg 11 is extended and the weight of the trailer transferred to the leg, the foot 13 will pivot on the bolt 47 to conform to the slope (if any) of the ground and also move upwardly relative to the leg as permitted by movement of the bolt 47 up in the slots 41 to a position wherein the elastomeric pad is compressed and bearing the full weight of the trailer, it being understood that the bolt 47 is under no load.

In accordance with the method of this invention, the foot 13 of the landing gear may be made in a singe die operation wherein a continuous metal web of suitable thickness (e.g., ¼-in.) is intermittently fed in foot-length intervals into suitable tooling which, on the downstroke of a press, progressively (a) shears the web to form a plate, (b) bends opposite ends 25 of the plate upwardly, (c) cuts or lances the plate to form a plurality of slits (indicated at S in FIG. 11A) in the plate at the periphery of the central portion 13a of the plate, and (d) deforms the plate to provide a plurality of upwardly-projecting ribs 27 in the outer portion 13b of the plate extending outwardly from the slits toward the periphery of the plate, as shown in FIG. 11B. The shape of the slits S will depend on the shape of the tube 15 and the position of the ribs with respect to the tube. Thus, for a rectangular tube, four L-shaped slits S may be cut at locations corresponding to the four corners of the tube as welded to the central portion of the plate. For tubes of other shapes, the slits will be of correspondingly different shapes. It will be apparent that the outer edges of the slits as formed (i.e., the edges of the slits toward the periphery of the plate) will form the inner edges of the ribs 27 when the latter are formed, and that the inner edges of the slits will define portions of the periphery of the central portion 13a of the plate.

While it is contemplated that the above steps (a)–(d) will be effected in a single die operation (that is, in a single downstroke), it will be understood that the steps may be effected sequentially in separate die operations.

As illustrated in FIGS. 12 and 13, the tube 15 is formed by intermittently feeding a continuous web of sheet metal forwardly, punching holes 43 in the web at suitable intervals by suitable means at a first station (not shown), and then, at a second die station 61, shearing the web and bending it in a single die operation to form a channel-shaped member 15a or 15b. After removal from the die 61, two such members 15a, 15b are then applied to the central portion 13a of a foot 13 with the members extending generally at right angles to the foot to form a tube 15, and with the edges of the flanges 33 of the channels spaced apart to define gaps G. With the channel members 15a, 15b held in this position (as by a suitable fixture), the members are welded at their bottoms to the central portion of the foot and at their corners to the inner ends of the ribs 27.

With the channel members 15a, 15b welded to the foot 13 to form tube 15, the elastomeric pad 17 is placed in the tube, the bearing plate 19 placed in the tube over the elastomeric member, and the lower end of the leg inserted in the tube over the bearing plate. The bolt 47 is then inserted and the nut 49 applied to hold the components in assembly.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Landing gear for a vehicle such as a trailer, comprising a leg, a foot at the lower end of the leg adapted for engagement with the ground, a pair of substantially identical generally channel-shaped members each having a web and a pair of generally parallel flanges extending away from the web and terminating in edges, the members being disposed so that the edges of the flanges of one channel-shaped member face the edges of the flanges of the other channel-shaped member to form a tube of generally rectangular cross section which extends up from the foot and telescopically receives the lower end of said leg, an elastomeric member disposed in the tube between the lower end of the leg and the foot, bearing plate means on the tube interposed between the elastomeric member and the lower end of the leg, and means attaching the tube to the lower end of the leg and permitting limited telescopic movement of the leg and the foot whereby said foot is adapted to move upwardly relative to the leg as the landing gear accepts the weight of the vehicle thereby resiliently to compress the elastomeric member between the foot and said bearing plate means.

2. Landing gear as set forth in claim 1 wherein said tube is welded at its lower end to said foot.

3. Landing gear as set forth in claim 2 wherein said foot comprises a plate having a central portion and a plurality of ribs struck upwardly from the plate and radiating outwardly from the central portion of the plate, said tube being welded at its bottom to the central portion of the plate and at its sides to the inner ends of said ribs.

4. Landing gear as set forth in claim 3 wherein said plate forming said foot is generally rectangular and said upwardly-struck ribs extend generally diagonally with respect to said plate generally from the four corners of the tube.

5. Landing gear as set forth in claim 3 wherein said ribs are of generally inverted-V shape in transverse cross section.

6. Landing gear as set forth in claim 1 wherein said foot comprises a plate having a central portion and a plurality of ribs struck upwardly from the plate and radiating outwardly from the central portion of the plate, said tube being welded at its bottom to the central portion of the plate and at its sides to the inner ends of said ribs.

7. Landing gear as set forth in claim 6 wherein said upwardly-struck ribs radiate outwardly from the four corners of the tube.

8. Landing gear as set forth in claim 6 wherein said ribs are of generally inverted-V shape in transverse cross section.

9. Landing gear as set forth in claim 1 wherein said means for attaching the tube to the lower end of the leg is adapted for permitting relative pivotal movement of the leg and the tube about a generally horizontal axis extending generally in side-to-side direction with respect to the vehicle.

10. Landing gear as set forth in claim 9 wherein said foot is adapted to pivot to a position in it is inclined downwardly in front-to-rear direction with respect to the vehicle when the foot is raised above the ground.

11. Landing gear as set forth in claim 10 wherein said elastomeric member comprises a relatively thick flat elastomeric pad having one or more bosses on either its upper or lower face adjacent one side of the pad, constituting its rearward side, whereby when the foot is moved to a position above the ground it is adapted to pivot to said inclined position.

12. Landing gear as set forth in claim 11 further comprising a depression in the face of the pad opposite each of said bosses to accommodate compression of the bosses when the pad is loaded.

13. Landing gear as set forth in claim 10 wherein the center of gravity of the foot is offset rearwardly with respect to the central vertical axis of the leg whereby said foot is adapted to pivot to said inclined position when it is raised above the ground.

14. Landing gear for a vehicle such as a trailer, comprising a leg, a foot at the lower end of the leg adapted for engagement with the ground, said foot comprising a metal plate having a central portion and an outer portion surrounding said central portion, a plurality of upwardly-projecting ribs in said outer portion of the plate radiating outwardly from said central portion of the plate, a metal tube generally rectangular in horizontal cross section extending up from the foot and receiving the lower end of said leg, said tube being welded at its lower end to said central portion of the plate and at its sides to the inner ends of said ribs, each rib being of generally inverted-V shape in transverse cross section and having a shoulder at its inner end sufficiently wide to engage a respective corner of the tube and portions of the side walls adjacent the corner, an elastomeric member disposed in the tube between the lower end of the leg and the foot, bearing plate means in the lower end of the leg and the foot, bearing plate means in the tube interposed between the elastomeric member and the lower end of the leg, and means attaching the tube to the lower end of the leg and permitting limited telescopic movement of the leg and the tube whereby said foot is adapted to move upwardly relative to the leg as the landing gear accepts the weight of the vehicle thereby resiliently to compress the elastomeric member between the foot and said bearing plate means.

* * * * *